United States Patent [19]

Sikonia

[11] 4,167,473
[45] Sep. 11, 1979

[54] MULTIPLE-STAGE CATALYTIC REFORMING WITH GRAVITY-FLOWING DISSIMILAR CATALYST PARTICLES

[75] Inventor: John G. Sikonia, La Grange, Ill.
[73] Assignee: UOP Inc., Des Plaines, Ill.
[21] Appl. No.: 902,461
[22] Filed: May 2, 1978

Related U.S. Application Data

[63] Continuation of Ser. No. 809,970, Jun. 27, 1977, abandoned.

[51] Int. Cl.$^2$ ............................................. C10G 35/08
[52] U.S. Cl. ..................................... 208/140; 208/64; 208/65; 208/139
[58] Field of Search ................... 208/64, 65, 169, 140, 208/174, 139

[56] References Cited
U.S. PATENT DOCUMENTS

| | | | |
|---|---|---|---|
| 2,854,400 | 9/1958 | Weisz | 208/111 |
| 3,287,253 | 11/1966 | McHenry et al. | 208/64 |
| 3,470,090 | 9/1969 | Carson | 208/138 |
| 3,864,240 | 2/1975 | Stone | 208/64 |
| 3,992,465 | 11/1976 | Juquin et al. | 208/64 |

*Primary Examiner*—C. Davis
*Attorney, Agent, or Firm*—James R. Hoatson, Jr.; Robert W. Erickson; William H. Page, II

[57] ABSTRACT

A multiple-stage catalytic conversion system in which a hydrocarbonaceous charge stock and hydrogen flow serially through a plurality of catalytic reaction zones in each of which the catalyst particles are downwardly movable via gravity-flow. Dissimilar catalyst particles are utilized in the reactor systems, each of which is integrated with separate regenerating towers through which the catalyst particles are also downwardly movable via gravity-flow. Dissimilarity of the catalysts stems from a difference in activity and stability characteristics. In turn, this difference may be attributed either to physical, or chemical changes between the two composites, or a combination of both.

9 Claims, 1 Drawing Figure

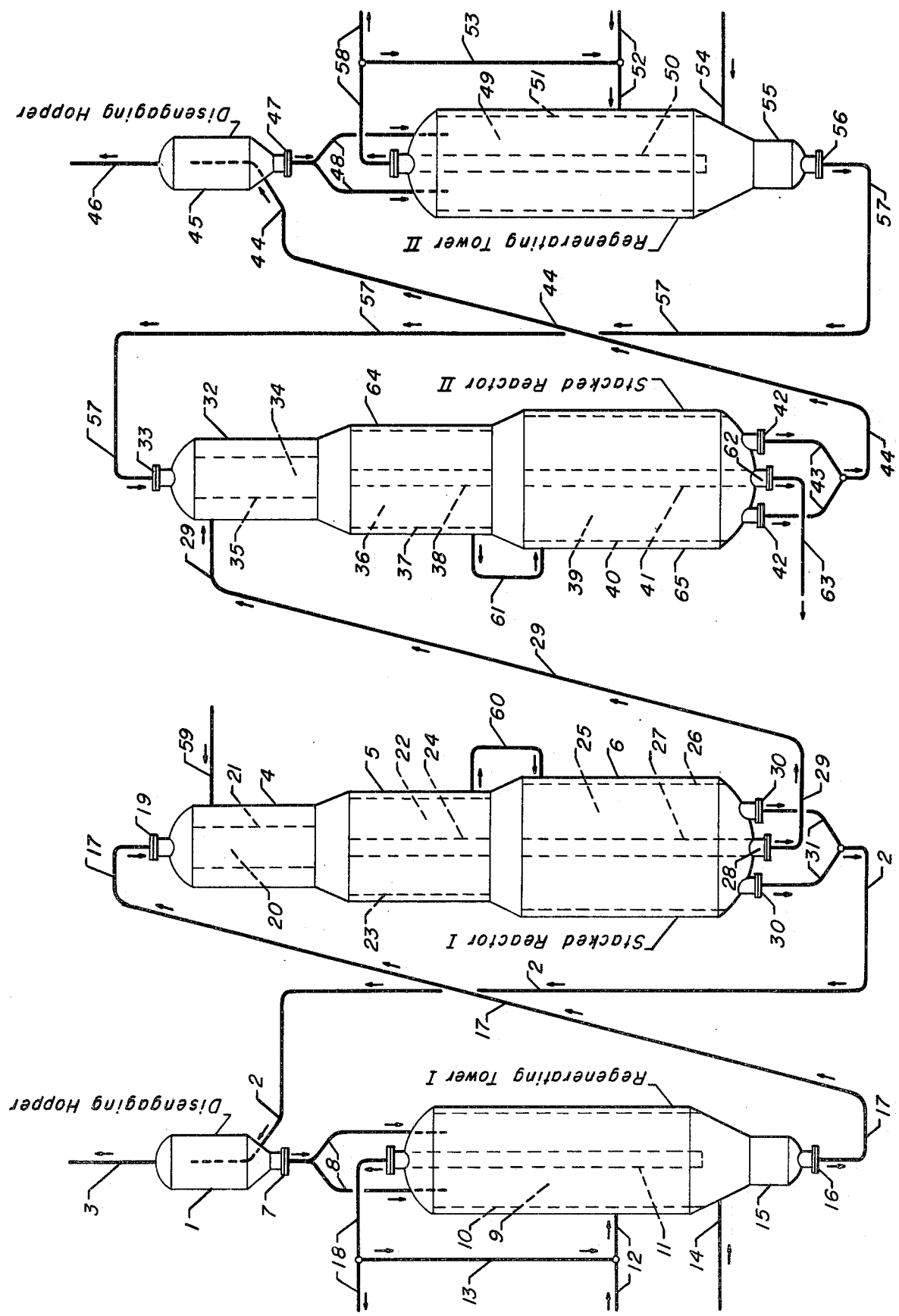

MULTIPLE-STAGE CATALYTIC REFORMING WITH GRAVITY-FLOWING DISSIMILAR CATALYST PARTICLES

This application is a continuation of Ser. No. 809,970, filed June 27, 1977 and now abandoned.

APPLICABILITY OF INVENTION

The present invention is directed toward an improved technique for effecting the catalytic conversion of a hydrocarbonaceous reactant stream in a multiple-stage reaction system wherein (i) the reactant stream flows serially through the plurality of reaction zones and, (ii) the catalyst particles are movable through each reaction zone via gravity-flow. More particularly, the described technique is adaptable for utilization in vapor-phase systems wherein the conversion reactions are principally endothermic, and where the flow of the hydrocarbonaceous reactant stream, with respect to the downward direction of catalyst particle movement, is cocurrent and laterally radial.

Various types of multiple-stage reaction systems have found widespread utilization throughout the petroleum and petrochemical industries for effecting multitudinous reactions, especially hydrocarbon conversion reactions. Such reactions are either exothermic, or endothermic, and encompass both hydrogen-producing and hydrogen-consuming processes. Multiple-stage reaction systems generally take one of two forms: (1) side-by-side configuration with intermediate heating between the reaction zones, and wherein the reactant stream or mixture flows serially from one zone to another zone; and, (2) a stacked design wherein a single reaction chamber, or more, contains the multiple catalytic contact stages. Such reactor systems, as applied to petroleum refining, have been employed to effect numerous hydrocarbon conversion reactions including those which are prevalent in catalytic reforming, solid catalytic alkylation, ethylbenzene dehydrogenation to produce styrene, other dehydrogenation processes, etc. My invention is specifically intended for utilization in those processes where the conversion reactions are effected in vapor-phase and catalyst particles are movable via gravity-flow, and where the reaction system exists in side-by-side relation, where two or more catalytic contact zones are "stacked", or where one or more additional reaction zones are disposed in a side-by-side relationship with the stack.

Since catalyst particles which are movable through a reaction system by way of gravity-flow are necessarily moving in a downwardly direction, the present technique contemplates the withdrawal of catalyst particles from a bottom portion of one reaction zone and the introduction of fresh, or regenerated catalyst particles into the top portion of a second reaction zone. The present technique is also intended to be applied to those reaction systems wherein the catalyst is disposed as an annular-form bed and the flow of the reactant stream, serially from one zone to another, is perpendicular, or laterally radial to the movement of catalyst particles.

A radial-flow reaction system generally consists of tubular-form sections, having varying nominal cross-sectional areas, vertically and coaxially disposed to form the reaction vessel. Briefly, the system comprises a reaction chamber containing a coaxially disposed catalyst-retaining screen, having a nominal, internal cross-sectional area less than said chamber, and a perforated centerpipe having a nominal, internal cross-sectional area which is less than the catalyst-retaining screen. The reactant stream is introduced, in vapor-phase, into the annular-form space created between the inside wall of the chamber and the outside surface of catalyst-retaining screen. The latter forms an annular-form, catalyst-holding zone with the outside surface of the perforated centerpipe; the vaporous reactant stream flows laterally and radially through the screen and catalyst zone into the centerpipe and out of the reaction chamber. Although the tubular-form configuration of the various reactant components may take any suitable shape—e.g. triangular, square, oblong, diamond, etc.—many design, fabrication and technical considerations dictate the advantages of using components which are substantially circular in cross-section.

Illustrative of a multiple-stage stacked reactor system, having gravity-flowing catalyst particles to which the present invention is particularly adaptable, is that shown in U.S. Pat. No. 3,706,536 Cl. 23-288G), issued Dec. 19, 1972. Transfer of the gravity-flowing catalyst particles, from one reaction zone to another, as well as introduction of fresh catalyst particles and withdrawal of "spent" catalyst particles, is effected through the utilization of a plurality of catalyst-transfer conduits. Deactivated catalyst particles are withdrawn from the last reaction zone and transferred to a regenerating tower through which they are also downwardly movable via gravity-flow.

It is to such systems, as well as those hereafter discussed as being illustrative of the current known state of the art, that the present invention is intended to be most appropriately applicable. Briefly, my invention concept encompasses a process having two separate reactor systems, each of which contains from one to three individual reaction zones and each of which is integrated with a separate regenerating tower. Each system contains a catalytic composite having different activity and stability characteristics than the composite in the other system. More specifically, the process herein described is intended to be utilized in the catalytic reforming of a hydrocarbonaceous charge stock for the production of high yields of a high octane-blending value normally liquid product.

OBJECTS AND EMBODIMENTS

A principal object of my invention is to afford an improved operating technique for the catalytic reforming process. A corollary objective is to increase the operating efficiency thereof while simultaneously increasing the effective utilization of the catalytic composite employed therein.

Other objects involve increased yields of normally liquid product—i.e. pentanes and heavier hydrocarbons—and hydrogen, the latter having increased purity which enhances its use for recycle purposes.

Therefore, one embodiment of the present invention is directed toward a process for catalytically reforming a hydrocarbonaceous charge stock which comprises the sequential steps of: (a) reacting said charge stock and hydrogen in contact with a first catalytic composite disposed in a first reactor system through which catalyst particles are downwardly movable via gravity-flow; (b) further reacting the resulting first reactor system effluent in contact with a second catalytic composite disposed in a second reactor system through which catalyst particles are downwardly movable via gravity-flow, said second catalytic composite having different activity and stability characteristics than said first catalytic composite; (c) at least periodically withdrawing deactivated catalyst particles from said first reactor system and introducing said withdrawn catalyst particles into a first regenerating tower through which catalyst particles are downwardly movable via gravity-flow; (d) at least periodically withdrawing deactivated catalyst particles from said second reactor system and introducing said withdrawn catalyst particles into a second regenerating tower through which catalyst particles are downwardly movable via gravity-flow; (e) regenerating said first and second catalyst particles in said first and second regenerating towers, in contact therein with air, halogen and steam, and drying the resulting regenerated catalyst particles; (f) withdrawing dried, regenerated catalyst particles from said first regenerating tower and at least periodically introducing said regenerated first catalytic composite into said first reactor system; and, (g) withdrawing dried, regenerated catalyst particles from said second regenerating tower and at least periodically introducing said regenerated second catalytic composite into said second reactor system.

In a more specific embodiment, the first and second catalytic composites each contain at least one Group VIII noble metal component and a halogen component, composited with a refractory inorganic oxide, and the difference in activity and stability characteristics is effected via differing noble metal concentrations.

These, as well as other objects and embodiments will become evident from the following, more detailed description of the present hydrocarbon conversion process. In one such other embodiment, the first and second catalytic composites each contain a Group VIII noble metal component and at least one catalytic metallic modifier, and the difference in activity and stability characteristics is effected via different catalytic modifiers.

PRIOR ART

Candor compels recognition of the fact that various types of hydrocarbon conversion processes utilize multiple-stage reactor systems, either in a side-by-side configuration, as a vertically-disposed stack, or a combination of a stacked system in side-by-side relation with one or more separate reaction zones. As applied to petroleum refining, such systems may be employed in a wide variety of hydrocarbon conversion reactions. While my inventive concept is adaptable to many conversion reactions and processes, through the reactor system of which the catalyst particles are movable via gravity-flow, the same will be further described in conjunction with the well known endothermic catalytic reforming process.

Historically, catalytic reforming was effected in a non-regenerative, fixed-bed system comprising a plurality of reaction zones disposed in side-by-side relation. When the catalytic composite had become deactivated to the extent that continuous operation was no longer economically feasible, the entire unit was shut down and the catalyst regenerated in situ. Of a more recent vintage was the so-called "swing bed" system in which an extra reactor was substituted for one which was due to be placed off-stream for regeneration purposes. Still more recently, multiple-stage reactor systems have been provided in which the catalyst particles flow, via gravity, through each reaction zone. In a "stacked" system, the catalyst particles also flow downwardly from one catalyst-containing zone to another, and utimately transfer to a suitable regeneration system also preferably functioning with a downwardly-moving bed of catalyst particles. In effect, the catalyst particles are maintained from one section to another in a manner such that the flow of catalyst particles is continuous, at frequent intervals, or at extended intervals, with the movement being controlled by the quantity of catalyst withdrawn from the last of the series of individual reaction zones.

U.S. Pat. No. 3,470,090 (Cl. 208-138), issued Sept. 30, 1969 illustrates a multiple-stage, side-by-side reaction system with intermediate heating of the reactant stream which flows serially through the individual reaction zones. Catalyst particles withdrawn from any one of the reaction zones are transported to suitable regeneration facilities. This type of system can be modified to the extent that the catalyst particles withdrawn from a given reaction zone are transported to the next succeeding reaction zone, while the catalyst withdrawn from the last reaction zone may be transported to a suitable regeneration facility. The necessary modifications can be made in the manner disclosed in U.S. Pat. No. 3,839,197 (Cl. 208-174), issued Oct. 1, 1974, involving an inter-reactor catalyst transport method. Catalyst transfer from the last reaction zone in the plurality to the top of the catalyst regeneration zone is made possible through the use of the technique illustrated in U.S. Pat. No. 3,839,196 (Cl. 208-174), issued Oct. 1, 1974.

A stacked reaction zone configuration is shown in U.S. Pat. No. 3,647,680 (Cl. 208-65), issued Mar. 7, 1974, as a two-stage system having an integrated regeneration facility which receives that catalyst withdrawn from the bottom reaction zone. Similar stacked configurations are illustrated in U.S. Pat. No. 3,692,496 (Cl. 23-288G), issued Sept. 19, 1972, and U.S. Pat. No. 3,725,249 (Cl. 208-139) issued Apr. 3, 1973.

U.S. Pat. No. 3,725,248 (Cl. 208-138), issued Apr. 3, 1973 illustrates a multiple-stage system in side-by-side configuration with gravity-flowing catalyst particles being transported from the bottom of one reaction zone to the top of the next succeeding reaction zone, those catalyst particles being removed from the last reaction zone being transferred to suitable regeneration facilities.

As hereinbefore stated, general details of a three-reaction zone, stacked system are presented in U.S. Pat. No. 3,706,536 (Cl. 23-288G), issued Dec. 19, 1972, and illustrates one type of multiple-stage system to which the present inventive concept is applicable. As generally practiced in a catalyst reforming unit, each succeeding reaction zone contains a greater volume of catalyst in that the annular-form catalyst-holding zone is greater in cross-sectional area.

These illustrations are believed to be fairly representative of the art which has been developed in multiple-stage conversion systems wherein catalyst particles are movable through each reaction zone via gravity-flow.

Relatively recent U.S. Pat. No. 3,981,824 (Cl. 252-415), issued Sept. 21, 1976, is directed specifically toward a regeneration method for gravity-flowing catalyst particles which comprise a Group VIII noble metal component and a halogen component composited with a suitable refractory inorganic oxide—e.g. gamma alumina. This particular method, as well as others, is suitable for use in the present processing technique.

U.S. Pat. No. 3,864,240 (Cl. 208-64), issued Feb. 4, 1975, is illustrative of the integration of a reaction system having gravity-flowing catalyst particles with a fixed-bed system. As stated in this reference, one of the advantages resides in revamping an existing three-reaction zone, fixed-bed system to conform to the integrated system. Indicated is the advantage of enabling a refiner to adjust his ultimate product slate by having a mordenite-containing composite in the gravity-flowing zone as contrasted to a principally alumina catalyst in the plurality of fixed-bed reaction zones. However, there is no indication of utilizing composites having different activity and stability characteristics in a process having all gravity-flowing catalyst systems. Furthermore, there is no awareness of effecting the difference through changes in active metal component concentration and/or kind, or in changes with respect to halogen content.

In brief summation, the prior art directed toward catalytic conversion systems in which all the catalyst particles are movable via gravity-flow, is not cognizant of the technique herein described wherein two separate systems utilize catalytic composites having different degrees of activity and stability, each system having a separate regenerating tower.

SUMMARY OF INVENTION

To reiterate briefly, the process encompassed by my inventive concept is suitable for use in hydrocarbon conversion systems which are characterized as multiple-stage and in which catalyst particles are movable via gravity-flow through each reaction zone. Furthermore, the present invention is principally intended for utilization in reactor systems where the principal reactions are endothermic and are effected in vapor-phase. Although the following discussion is specifically directed toward catalytic reforming of naphtha boiling range fractions, there is no intent to so limit the present invention. Catalytic reforming, as well as many other processes, has experienced several phases of development currently terminating in the system in which the catalyst beds assume the form of a descending column in one or more reaction vessels. Typically, the catalysts are utilized in spherical form having a nominal diameter ranging from about 1/32-inch to about 5/32-inch in order to offer free-flow characteristics which will neither bridge, nor block the descending column, or columns of catalyst within the overall reactor system.

In one such multiple-stage system, the reaction chambers are vertically stacked, and a plurality (generally from about 6 to about 16) of relatively small diameter conduits are employed to transfer catalyst particles from one reaction zone to the next lower reaction zone (via gravity-flow) and ultimately to withdraw catalyst particles from the last reaction zone. The latter are usually transported to the top of a catalyst regeneration facility, also functioning with a descending column of catalyst particles; regenerated catalyst particles are then transported to the top of the upper reaction zone of the stack. In order to facilitate and enhance gravity-flow within each reaction vessel, as well as from one zone to another, it is particularly important that the catalyst particles have a relatively small nominal diameter, and one which is preferably less than about 5/32-inch. In a conversion system having the individual reaction zones in side-by-side relationship, catalyst transport vessels (of the type shown in U.S. Pat. No. 3,839,197) are employed in transferring the catalyst particles from the bottom of one zone to the top of the succeeding zone, and from the last reaction zone to the top of the regeneration facility.

Catalytic reforming of naphtha boiling range hydrocarbons, a vapor-phase operation, is effected at conversion conditions which include catalyst bed temperatures in the range of about 700° F. to about 1020° F.; judicious and cautious techniques generally dictate that catalyst temperatures not substantially exceed a level of about 1020° F. Other conditions generally include a pressure from about 50 psig. to about 100 psig., a liquid hourly space velocity (defined as volumes of fresh charge stock per hour, per volume of total catalyst particles) of from 0.2 to about 10.0 and a hydrogen to hydrocarbon mole ratio in the range of about 1.0:1.0 to about 10.0:1.0. As those possessing the requisite skill in the petroleum refining art are aware, the described continuous regenerative reforming system offers numerous advantages when compared to the prior art fixed-bed systems. Among these is the capability of efficient operation at comparatively lower pressures—e.g. 50 psig. to about 200 psig.—and higher liquid hourly space velocities—e.g. about 3.0:1.0 to about 8.0:1.0. As a result of continuous catalyst regeneration, higher consistent inlet catalyst bed temperatures can be maintained—e.g. 950° F. to about 1010° F. Furthermore, there is afforded a corresponding increase in both hydrogen production and hydrogen purity in the recycled vaporous phase from the product separation facility.

Catalytic reforming reactions are multifarious, and include dehydrogenation of naphthenes to aromatics, the dehydrocyclization of paraffins to aromatics, the hydrocracking of long-chain paraffins into lower-boiling normally-liquid material and, to a certain extent, the isomerization of paraffins. These reactions, the net result of which is endothermicity, are effected through the utilization of one or more Group VIII noble metals (e.g. platinum, osmium, iridium, rhodium, ruthenium, palladium) combined with a halogen (e.g. chlorine and/or fluorine) and a porous carrier material such as alumina. Recent investigations have indicated that more advantageous results are attainable and enjoyed through the cojoint utilization of a catalytic modifier; these are generally selected from the group of iron, cobalt, copper, nickel, gallium, zinc, germanium, tin, cadmium, rhenium, bismuth, vanadium, alkali and alkaline earth metals, and mixtures thereof. Regardless of the particular selected catalytic composite, the ability to attain the advantage over the common fixed-bed systems is greatly dependent upon achieving acceptable catalyst flow downwardly through both the reactor system and the regenerating tower.

Catalytic reforming is a well known process which has been thoroughly described in the literature, having been a commercially important tool of the petroleum refining industry for about three decades. One of the many things gleaned from the vast amount of catalytic reforming experience, and resulting knowledge, is the soundness of utilizing multiple stages, each of which contains a different quantity of catalyst, generally expressed as volume percent. The reactant stream, hydrogen and the hydrocarbon feed, flow serially through the reaction zones in order of increasing catalyst volume with, of course, interstage heating. In a three-reaction zone system, typical catalyst loadings are: first, 10.0% to about 30.0%; second, from about 20.0% to about 40.0%; and, third, from about 40.0% to about 60.0%. With respect to a four-reaction zone system, suitable catalyst loading would be: first, 5.0% to about 15.0%; second, 15.0% to about 25.0%; third, 25.0% to about 35.0%, and, fourth, 35.0% to about 50.0%. Unequal catalyst distribution, increasing in the serial direction of reactant stream flow, facilitates and enhances the distribution of the reactions as well as the overall heat of reaction.

Reforming catalytic composites known and described in the appropriate prior art are intended for use in the process encompassed by the present invention. Essential, however, to my invention is the utilization of dissimilar reforming catalysts which may be characterized as possessing different combined activity and stability characteristics. For the purposes of further explanation, it is believed that several definitions are warranted. As employed herein, "activity" is defined as the level of operating severity required to attain a given, desired octane rating with respect to the normally liquid reformed product effluent—i.e. pentanes and heavier hydrocarbons. As an example, considering a final product having a clear research octane rating of 100.0, with all variables excepting catalyst bed temperature being constant, a catalyst producing the indicated product at 945° F. (507° C.) is more active than one which requires a temperature of 965° F. (518° C.). Likewise, where catalyst bed temperature is maintained constant and liquid hourly space velocity (LHSV) is adjusted to attain the target octane rating, a catalyst which produces the desired result at 2.0 LHSV is more active than one requiring 1.75 LHSV.

Catalyst "stability" is herein defined as the rate of change in activity relative to catalyst life measured as barrels of charge stock per pound of catalyst (BPP) disposed within the reaction chamber. Among those versed in catalytic reforming catalysis, stability is most often expressed in units of temperature increase per unit of catalyst life to maintain a constant target octane rating with respect to the normally liquid product effluent—this is commonly stated as °F./BPP. Thus, a catalytic composite indicating a deactivation rate of 2.5 °F./BPP is significantly more stable than one which deactivates at a rate of 8.0° F./BPP. Also utilized in selecting the catalytic composites for use in reforming systems are the yield of pentanes and heavier product and the purity of hydrogen in the gaseous products. With respect to the latter, calculations are generally based upon the total quantity of butanes and lighter vaporous material.

Reforming catalytic composites are unique in that they possess dual functionality; although this may be defined in a number of ways, the most common is that such catalysts simultaneously exhibit acidic properties as well as metallic hydrogenation/dehydrogenation functionality. Dissimilarity of the catalysts employed in the present processing technique is primarily achieved by varying the dual-function character of the composites. As above set forth, the catalytic composites exhibit different combined activity and stability characteristics. In explanation, it will be presumed that a wide spectrum of reforming catalytic composites are subjected to activity and stability performance tests, and are rated, in comparison to a standard catalyst, and to each other on a basis of one through ten, the latter representing highest activity and greatest activity. In accordance with this arbitrarily selected scale, where catalyst "A" has an activity of 5 and a stability rating of 10, while catalyst "B" has an activity of 10 and exhibits a stability rating of 5, the catalysts have different combined activity and stability characteristics. Likewise, where both composites have an activity rating of 8, and one a stability rating of 8, while the second a stability rating of 3, they have different combined activity and stability characteristics for the purposes of the present invention.

Reforming catalysts, as hereinbefore, stated, comprise at least one Group VIII noble metal component, platinum, palladium, rhodium, ruthenium, osmium and/or iridium, and an acid-acting halogen component, generally chlorine, fluorine, or both. These are composited, during manufacture, with a refractory inorganic oxide from the group of alumina, silica, zirconia, strontia, magnesia, hafnia and mixtures thereof, etc. Catalytic modifiers, of the type previously described, are often combined therewith for the purpose of adjusting the activity/stability relationship. Catalytic attenuators, selected from alkali and alkaline-earth metals are employed at times when charge stock characteristics so dictate. The Group VIII noble metal component, or components, will be present in an amount of about 0.1% to about 2.0% by weight, calculated on an elemental basis. Excellent results are achievable when the catalyst contains about 0.3% to about 0.9% by weight of the Group VIII noble metal component, or components. Halogen may be composited with the carrier material during impregnation of the latter with the active metallic components. The quantity of halogen, whether chlorine, fluorine, or both, is such that the final catalytic composite contains about 0.1% to about 1.5% by weight, and most generally from about 0.3% to about 1.2%, calculated on an elemental basis. With respect to the metallic catalytic modifiers, they are preferably present in an amount in the range of about 0.1% to about 5.0% by weight, again on an elemental basis. Regardless of the absolute quantities or character of these catalytic modifiers, the atomic ratio of the Group VIII noble metal to the catalytic modifier in the catalyst is preferably selected from the range of 0.1:1.0 to about 3.0:1.0, with excellent results being attainable at an atomic ratio of about 0.5:1.0 to about 1.5:1.0.

In particular situations, with certain naphtha boiling range feedstocks, it may be desirable to attenuate the acid function of the selected catalytic composite. This is accomplished through the addition of an alkalinous metal component in the amount of from about 0.01% to about 1.5% by weight. This component is selected from the group of lithium, sodium, potassium, rubidium, cesium, barium, strontium, calcium, magnesium, beryllium, mixtures of two or more, etc. Reforming catalytic composites, following preparation and calcination thereof, are subjected to a substantially water-free reduction in hydrogen. Reduction may be conveniently performed in situ as an integral step of a start-up sequence provided precautions are observed to pre-dry the system to a substantially water-free state. Catalytic reforming processes may be improved when the reduced composite is subjected to a presulfiding operation to incorporate from about 0.05% to about 0.5% by weight of sulfur, on an elemental basis.

The difference in activity and stability characteristics can be achieved through changes in physical properties, chemical properties, or both. The former would include apparent bulk density, pore diameter (nominal) and surface area as generally measured in square meters per gram of catalyst. Changes in chemical composition offer a wider variety of activity and/or stability characteristics and are, therefore, to be preferred. Considering first the refractory inorganic oxide carrier, alumina in and of itself, compared to one containing about 20.0% by weight of silica, will exhibit different activity and stability, notwithstanding the same Group VIII noble metal and halogen concentration. In the interest of both brevity and clarity, the following discussion will be limited to reforming catalysts utilizing an all-alumina carrier and chlorine as the halogen component. It is understood that there is no intent to so limit the present invention.

Where the cataytic composites both contain platinum as the Group VIII metallic component, the difference in activity and stability charactersistics (A/S characteristics) can be achieved simply by varying the concentration of the platinum. Thus, a composite of alumina, 0.9% chlorine and 0.75% by weight of platinum, will have different combined A/S characteristics than one of aluminia, 0.9% chlorine and 0.375% platinum. Similarly, a platinum/alumina catalyst containing 1.0% by weight of chlorine will have a different A/S characteristic than one which is substantially free from chlorine. On the other hand, the chlorine concentrations may be varied to effect the change in A/S characteristics. Additionally, one catalyst may contain as the sole Group VIII metallic component, while the second may contain both platinum and iridium. Bi-metallic compositions will differ from mono-metallic composites, as will tri-metallic and tetra-metallic composites.

Likewise, a catalyst containing platinum, vanadium and chlorine composited with alumina, will be different in A/S characteristics than the same catalyst without vanadium. A platinum/alumina/chlorine catalyst will exhibit different characteristics than a palladium-/alumina/chlorine catalyst. Where the catalytic composite contains the same Group VIII component, and the same concentration of chlorine, the difference can be attained through the use of the same modifier in different concentrations. Whether a calcined and reduced catalyst is subjected to a sulfiding technique prior to use will also affect its A/S characteristics, as will a different concentration of sulfur where the other components and concentrations are identical.

Other changes in the chemical make-up of the dissimilar catalytic composites for use herein, to achieve different A/S characteristics, will become evident to those possessing the requisite skill in the catalytic reforming art. It is understood that no particular technique is essential to the method of the present invention, only that the activity and stability characteristics, however determined, be different.

Briefly, the present invention utilizes two separate reactor systems, through each of which the catalyst particles are movable downwardly via gravity-flow. Each system has integrated therewith its own individual regenerating tower, through which the catalyst particles are also downwardly movable via gravity-flow. Each reactor system contains a catalyst which exhibits different activity and stability characteristics than that catalyst disposed in the other reactor system. Catalyst particles are at least periodically withdrawn from each of the reactor systems and introduced into the respective regenerating towers. Regeneration is effected by contacting the deactivated particles with air, halogen and steam, followed by a drying operation in substantially moisture-free air. The catalyst particles may be subjected to a reduction technique either in a separate vessel, or in individual vessels integral with the individual reactor systems. Regardless, the regenerated and dried particles are at least periodically introduced into the individual reactor systems. The precise technique employed for catalyst regeneration and reconditioning (halogen readjustment) is not an essential feature of my invention—any of the prior art methods which employ combinations of air, steam and halogen will suffice.

With respect to the two reactor systems, each will comprise at least one reaction zone. Many varied configurations are made possible by virtue of the present invention. For instance, one system may contain two or three individual reaction zones while the second system consists of one or two individual zones. As previously set forth, the reaction zones contain varying quantities of catalyst, generally increasing in the direction of reactant stream flow. Catalytic reforming, being overall an endothermic process, requires inter-stage heating; therefore, the precise number of individual reaction zones and catalyst distribution will depend primarily upon the physical and chemical characteristics of the fresh feed charge stock and the final estimates relative to distribution of the reactions and overall heat of reaction. As hereinbefore stated, catalytic reforming involves four principles reactions, the overall result of which is temperature decrease, or endothermicity. Considering, for the sake of illustration, a four-reaction zone system having a catalyst distribution of 10.0%, 15.0%, 25.0% and 50.0%, the initial reaction zone serves to dehydrogenate substantially all the naphthenic hydrocarbons to form aromatics, a highly endothermic reaction. In the second reaction zone, following inter-heating to raise the temperature of the first zone effluent, the remaining naphthenes are dehydrogenated and dehydrocyclization of paraffins to produce aromatics is effected, also endothermic; the latter also takes place in the third reaction zone in addition to isomerization of normal paraffins to the isomeric counterparts. Some isomerization takes place in the fourth reaction zone along with the hydrocracking of long-chain paraffins into lower molecular weight, normally liquid paraffins. The present invention concept, using two dissimilar catalytic composites, when utilized in conjunction with continuous catalyst regeneration/catalytic reforming, in which catalyst particles are movable by way of gravity-flow, further enhances the many advantages of the latter and affords a process tailor-made to the charge stock characteristics and desired results.

BRIEF DESCRIPTION OF DRAWING

In further describing the present invention concept and the catalytic reforming process encompassed thereby, reference will be made to the accompanying drawing which serves to illustrate one or more embodiments thereof. Presentation is made via a simplified schematic flow diagram in which only the principle pieces of equipment are shown. These are: a two reaction zone stacked reactor system I; its regenerating tower I, having a catalyst disengaging hopper I; a two reaction zone system II; and, its regenerating tower II, having a catalyst disengaging hopper 2. Details such as pumps and compressors, heaters and coolers, condensers, heat-exchangers and heat-recovery circuits, start-up lines, valving and similar hardware have been omitted as being non-essential to a clear understanding of the techniques involved. The utilization of these miscellaneous appurtenances, to modify the illustrated process, is well within the purview of one skilled in the art, and will not remove the resulting process beyond the scope and spirit of the appended claims. It is further understood that the drawing is not scaled, but presented in a manner which best serves to illustrate the catalytic reforming process embraced by my inventive concept.

DETAILED DESCRIPTION OF DRAWING

Specifically referring now to the drawing, stacked reactor system I is shown as having two individual reaction zones 5 and 6, having disposed therein a catalytic composite of gamma alumina, 0.95% by weight of combined chlorine and about 0.75% by weight of platinum, and having a nominal diameter of 1/16-inch. On the arbitrarily selected basis of one through ten, this catalyst has an activity rating of about 8 and a stability of about 6. A dissimilar catalyst of gamma alumina, 0.95% by weight of combined chlorine and 0.375% by weight of platinum, also having a nominal diameter of 1/16-inch and presulfided to a sulfur level of 0.25% by weight, is disposed in reaction zones 64 and 65 of stacked reactor system II; this catalyst exhibits an activity level of 4 and a stability level of about 9. Thus, in this illustration, the fresh feed charge stock first "sees" the composite of comparatively high activity/low stability and subsequently the composite having comparatively low activity/high stability. In some situations, principally involving considerations of charge stock characteristics and overall heats of reaction, the composites may be reversed—i.e. low activity/high stability catalyst followed by high activity/low stability catalyst.

The naphtha boiling range feedstock, in admixture with a recycled hydrogen-rich vaporous phase, is introduced, via line 59, into a catalyst-holding and prereduction zone 4. This type of vessel, in which the catalyst is disposed in a central portion 20, and the feed reactant stream flows in the annulus formed by cylindrical housing 21 and the internal wall of zone 4, is of the type described in previously mentioned U.S. Pat. No. 3,706,536. The hydrogen to hydrocarbon mole ratio is about 6.0:1.0, the pressure approximately 100 psig. and the liquid hourly space velocity is about 1.5, based upon the total quantity of catalyst disposed in all four reaction zones 5, 6, 64 and 65. Prior to entering catalyst-holding zone 4, the combined hydrogen/hydrocarbon feed stream is increased in temperature to a level such that the inlet temperature in reaction zone 5 is about 950° F. (510° C.). The reactant stream flows laterally and radially from the annular space between the inside wall of reaction zone 5 and catalyst-retaining screen 23, into and through annular-form catalyst bed 22 and into perforated centerpipe 24 from which the resulting product effluent is withdrawn by way of conduit 60.

After passing through a reaction zone interheater (not illustrated), the product effluent continues through conduit 60 and is introduced thereby into reaction zone 6. The reactant stream again flows laterally and radially through annular-form catalyst bed 25 which is defined by catalyst-retaining screen 26 and perforated centerpipe 27. Reaction product effluent passes through outlet port 28 and line 29, increased in temperature and introduced thereby into catalyst-holding zone 32. As hereinbefore stated with respect to stacked reactor system I, catalyst particles from regenerating tower II, entering via inlet port 33, are pre-heated and pre-reduced in holding section 34 within cylindrical housing 35.

Reaction zone 64 also contains an annular-form catalyst bed 36, which is formed by perforated centerpipe 38 and catalyst retaining screen 37 and through which the reactant stream flows laterally and radially. The inlet temperature of the reactant stream is 950° F. (310° C.). Reaction product effluent from reaction zone 64 is withdrawn through line 61, increased in temperature to 950° F. (510° C.) and introduced into reaction zone 65.

The reactant stream flows laterally and radially from the outer annulus, formed by catalyst-retaining screen 40 and the interior wall of the reaction chamber 65, into and through annular-form catalyst bed 39 and into perforated centerpipe 41. The final product effluent is withdrawn through outlet port 62 and conduit 63, and transported thereby into cooler/condenser and separation facilities (not illustrated) to provide the normally liquid product and a hydrogen-rich vaporous phase. A portion of the latter is vented from the system by way of pressure control, the remainder being recycled to the stacked reactor system I through line 59.

With respect to effluent conduits 60 and 61, these will originate, in a commercially designed system, from the lowermost terminus of perforated centerpipes 24 and 38, respectively. They have been shown as emanating from the sides of reaction zones 5 and 64 only for convenience and simplification of the drawing.

Periodically, regenerated catalyst particles are transported through lift line 17 and introduced into catalyst-holding and pre-heating zone 4 via inlet port 19. Catalyst particles are withdrawn from bed 20, via a plurality of transfer conduits, generally numbering from about six to about sixteen, into annular-form catalyst bed 22. The particles flow via gravity therefrom, through another plurality of transfer conduits, into the annular-form catalyst bed 25 of reaction zone 6. Deactivated catalyst particles are removed from lowermost reaction zone 6 through a plurality of outlet ports 30 and conduits 31. These particles are introduced into a solids-withdrawal and transport vessel of the type shown in U.S. Pat. No. 3,856,662 (Cl. 208-171), issued Dec. 24, 1974, but not illustrated in the present drawing. The withdrawn catalyst particles are transported via lift line 2 into disengaging hopper 1. The disengaging hopper 1 serves to separate catalyst fines and dust-like particles which are removed through conduit 3 to a suitable metals recovery facility.

The catalyst particles are withdrawn through outlet port 7, and flow through a plurality of transfer conduits 8 into regenerating tower I. These deactivated catalyst particles are disposed therein as an annular-form catalyst bed 9 which is defined by a cylindrical catalyst-retaining screen 10 and the combustion products flue gas centerpipe 11. A mixture of air, steam and a chlorine-containing compound is introduced by way of conduit 12, admixed with recycled flue gas from line 13 and introduced into the upper carbon-burning/halogenation section of regenerating tower I. In this section, coke and other carbonaceous materials are removed and the chloride content of the catalytic composite is adjusted to its original level. Substantially dry air is introduced into the lower section of regenerating tower I, the drying section, by way of line 14, to remove substantially all the residual moisture from the catalyst particles. Flue gas combustion products are withdrawn through centerpipe 11 by way of conduit 18. A portion thereof is diverted through line 13 to combine with the mixture of steam, chlorine-containing compound and air being introduced through line 12; dilution with flue gas in this manner is advisable in order to maintain the oxygen level in the carbon-burning section at about a maximum of 2.0%, on a molal basis.

Dried, regenerated catalyst particles are withdrawn from the lowermost portion 15, through outlet port 16, and are transported via lift line 17 to catalyst-holding zone 4. A lift engager, or catalyst withdrawal and transport vessel of the type found in the prior art is employed in this service.

In a like manner, deactivated, chloride-deficient catalyst particles are withdrawn from stacked reactor system II through a plurality of outlet ports 42 and conduits 43. These are transported, by way of lift line 44 into disengaging hopper 45, for the removal of fines and other dust-like material through conduit 46. Catalyst particles are removed through outlet port 47 and introduced into regenerating tower II through a plurality of transfer conduits 48, and are disposed as an annular-form bed 49. The latter is formed by flue gas centerpipe 50 and catalyst-retaining screen 51. Air, steam and a chlorine-containing compound, in admixture with recycled flue gas combustion products from line 53, are introduced into the carbon-burning upper section via line 52. As previously stated in regard to regenerating tower I, coke and other carbonaceous matter is burned from the catalyst particles, and the chloride content is adjusted to its original level. A substantially dry air stream enters the lower drying section by way of conduit 54. The gaseous combustion products are withdrawn through flue gas centerpipe 50 and conduit 58; at least a portion thereof is diverted through line 53 for recycle to the carbon-burning/halogen adjustment section. Regenerated, substantially moisture-free reconditioned catalyst particles are withdrawn from the lowermost section 55 through outlet port 56, and transported via lift line 57 to the catalyst-holding zone 32 situated atop reactor system II.

The foregoing clearly illustrates the method of effecting the process encompassed by the present invention, and indicates the many advantages and benefits afforded through the utilization thereof. Others will become evident to those possessing the requisite skill in the catalytic reforming art.

I claim as my invention:

1. A process for catalytically reforming a hydrocarbonaceous charge stock in a two-reforming reactor system wherein the first and second reforming reactors contain discrete catalytic composite entities having different activity and stability properties, said process comprises the sequential steps of:
   (a) reacting said hydrocarbonaceous charge stock and hydrogen in contact with the first of said discrete catalytic composite entities comprising a Group VIII metal, a catalytic metal modifier, and a halogen component disposed in said first of said two reforming reactors on a porous support material through which said first catalytic entity is downwardly movable via gravity-flow to produce a first reforming reactor effluent stream;
   (b) further reacting said first reforming reactor effluent stream in contact with the second of said discrete catalytic composite entities comprising a Group VIII metal, a catalytic metal modifier, and a halogen component disposed in said second of said two reforming reactors on a porous support material through which said second catalytic entity is downwardly movable via gravity-flow, said second catalytic composite entity having different catalytic properties of activity and stability than said first catalytic entity as a result of a variance in the Group VIII metal, catalytic metal modifier, or halogen content;
   (c) at least periodically withdrawing a deactivated first catalytic entity from said first reforming reactor and introducing said withdrawn deactivated first entity into a first regenerating tower through which said deactivated first entity is downwardly movable via gravity-flow;
   (d) at least periodically withdrawing a deactivated second catalytic entity from said second reforming reactor and introducing said withdrawn deactivated second entity into a second regenerating tower through which said deactivated second entity is downwardly movable via gravity-flow;
   (e) regenerating both said deactivated first and second catalytic entities in said respective first and second regenerating towers, in contact therein with air, halogen and steam, and drying the resulting regenerated first and second catalytic entities;
   (f) withdrawing said dried, regenerated first catalytic composite entity from said first regeneration tower and at least periodically introducing said regenerated first catalytic entity into said first reforming reactor; and
   (g) withdrawing said dried, regenerated second catalytic composite entity having different catalytic properties of activity and stability than said regenerated first catalytic entity as a result of a variance in the Group VIII metal, catalytic metal modifier, or halogen content from said second regenerating tower and at least periodically introducing said regenerated second catalytic entity into said second reforming reactor.

2. The process of claim 1 further characterized in that said first reforming comprises a plurality of reaction zones and said first catalytic composite entity is movable from one zone to the next succeeding zone via gravity-flow.

3. The process of claim 1 further characterized in that said second reforming reactor comprises a plurality of reaction zones and said second catalytic composite entity is movable from one zone to the next succeeding zone via gravity-flow.

4. The process of claim 1 further characterized in that said first and second discrete catalytic composite entities each contain at least one Group VIII noble metal component, a catalytic metal modifier and a halogen component, composited with a refractory inorganic oxide, and the difference in activity and stability characteristics is effected via differing noble metal concentrations.

5. The process of claim 1 further characterized in that said first and second discrete catalytic composite entities each contain a halogen component and the difference in activity and stability characteristics is effected via differing halogen concentrations.

6. The process of claim 1 further characterized in that said first and second discrete catalytic composite entities each contain a Group VIII noble metal component and at least one catalytic metallic modifier, and the difference in activity and stability characteristics is effected via different catalytic modifiers.

7. The process of claim 1 further characterized in that said first reforming reactor contains at least two individual reaction zones and said second reforming reactor consists of a single reaction zone.

8. The process of claim 4 further characterized in that said Group VIII noble metal is platinum.

9. The process of claim 1 further characterized in that said first and second reforming reactors each contain two individual reaction zones.

* * * * *